(12) United States Patent
Byrne

(10) Patent No.: US 7,183,504 B2
(45) Date of Patent: Feb. 27, 2007

(54) ELECTRICAL FLOOR ACCESS MODULE SYSTEM

(76) Inventor: Norman R. Byrne, 2736 Honey Creek NE., Ada, MI (US) 49301

( * ) Notice: Subject to any disclaimer, the term of this patent is extended or adjusted under 35 U.S.C. 154(b) by 652 days.

(21) Appl. No.: 10/466,820

(22) PCT Filed: Feb. 6, 2002

(86) PCT No.: PCT/US02/03424

§ 371 (c)(1),
(2), (4) Date: Jul. 22, 2003

(87) PCT Pub. No.: WO02/063740

PCT Pub. Date: Aug. 15, 2002

(65) Prior Publication Data

US 2004/0080903 A1 Apr. 29, 2004

Related U.S. Application Data

(60) Provisional application No. 60/266,769, filed on Feb. 6, 2001.

(51) Int. Cl.
*H02G 3/08* (2006.01)
*E04B 5/00* (2006.01)
(52) U.S. Cl. .................... 174/486; 174/58; 174/59; 220/3.3; 439/577; 52/220.8; 52/263
(58) Field of Classification Search ............... 52/220.8, 52/263; 174/58, 59, 482, 486, 490; 220/3.3
See application file for complete search history.

(56) References Cited

U.S. PATENT DOCUMENTS

| | | | |
|---|---|---|---|
| 1,928,198 A | 9/1933 | Buchanan | |
| 2,738,892 A | 3/1956 | Wiesmann | |
| 2,811,574 A | 10/1957 | Guerrero | |
| 2,996,566 A | 8/1961 | Stas | |
| 3,061,663 A | * 10/1962 | Reiland | ..................... 174/486 |
| 3,131,512 A | 5/1964 | MacLeod, Jr. | |
| 3,395,243 A | 7/1968 | Kelly | |
| 3,433,886 A | 3/1969 | Myers | |
| 3,622,684 A | 11/1971 | Press | |
| 3,646,244 A | 2/1972 | Cole | |
| 3,794,956 A | 2/1974 | Dubreuil | |
| 3,975,074 A | 8/1976 | Fuller | |
| 4,146,287 A | 3/1979 | Jonsson | |
| 4,596,095 A | * 6/1986 | Chalfant | .................... 52/126.6 |
| 4,740,167 A | 4/1988 | Millhimes et al. | |

(Continued)

*Primary Examiner*—Robert Canfield
(74) *Attorney, Agent, or Firm*—Varnum, Riddering, et. al.

(57) ABSTRACT

An electrical floor access system (100) is provided so as to be accessible to the electrical equipment of an office system (50). The electrical system (100) includes a number of access floor modules (102) jpositioned beneath an access floor (30). The electrical system (100) also includes junciton block cables (104) and junction blocks (108) which can be connected the junction block cables (104). The junciton blocks (108) serve to provide electrical interconnection and mounting for electrical receptacles and similar devices for interconnection with electrical equipment. The access floor modules (102) are substantially interchangeable with each other, and the junction block cables (104) are substantially interchangeable with each other so as to provide an electrical system as a modular system adapted to be sized and configured in a manner which does not require any substantial number of different types and/or sizes of cables and other electrical equipment.

20 Claims, 7 Drawing Sheets

U.S. PATENT DOCUMENTS

| | | | |
|---|---|---|---|
| 5,023,396 A | 6/1991 | Bartee et al. | |
| 5,053,637 A * | 10/1991 | Dillard | 307/147 |
| 5,057,647 A * | 10/1991 | Bogden et al. | 174/482 |
| 5,107,072 A | 4/1992 | Morgan | |
| 5,122,069 A | 6/1992 | Brownlie et al. | |
| 5,178,555 A * | 1/1993 | Kilpatrick et al. | 439/215 |
| 5,467,565 A | 11/1995 | Bowman et al. | |
| 5,468,908 A * | 11/1995 | Arthur et al. | 174/482 |
| 5,477,649 A * | 12/1995 | Bessert | 52/263 |
| 5,705,772 A | 1/1998 | Brown | |
| 6,028,267 A | 2/2000 | Byrne | |
| 6,036,516 A * | 3/2000 | Byrne | 439/215 |
| 6,102,229 A | 8/2000 | Moncourtois | |
| 6,114,623 A | 9/2000 | Bonilla et al. | |
| 6,162,071 A * | 12/2000 | Muller | 439/142 |
| 6,175,078 B1 | 1/2001 | Bambardekar et al. | |
| 6,550,195 B1 * | 4/2003 | Cooper et al. | 52/220.3 |

\* cited by examiner

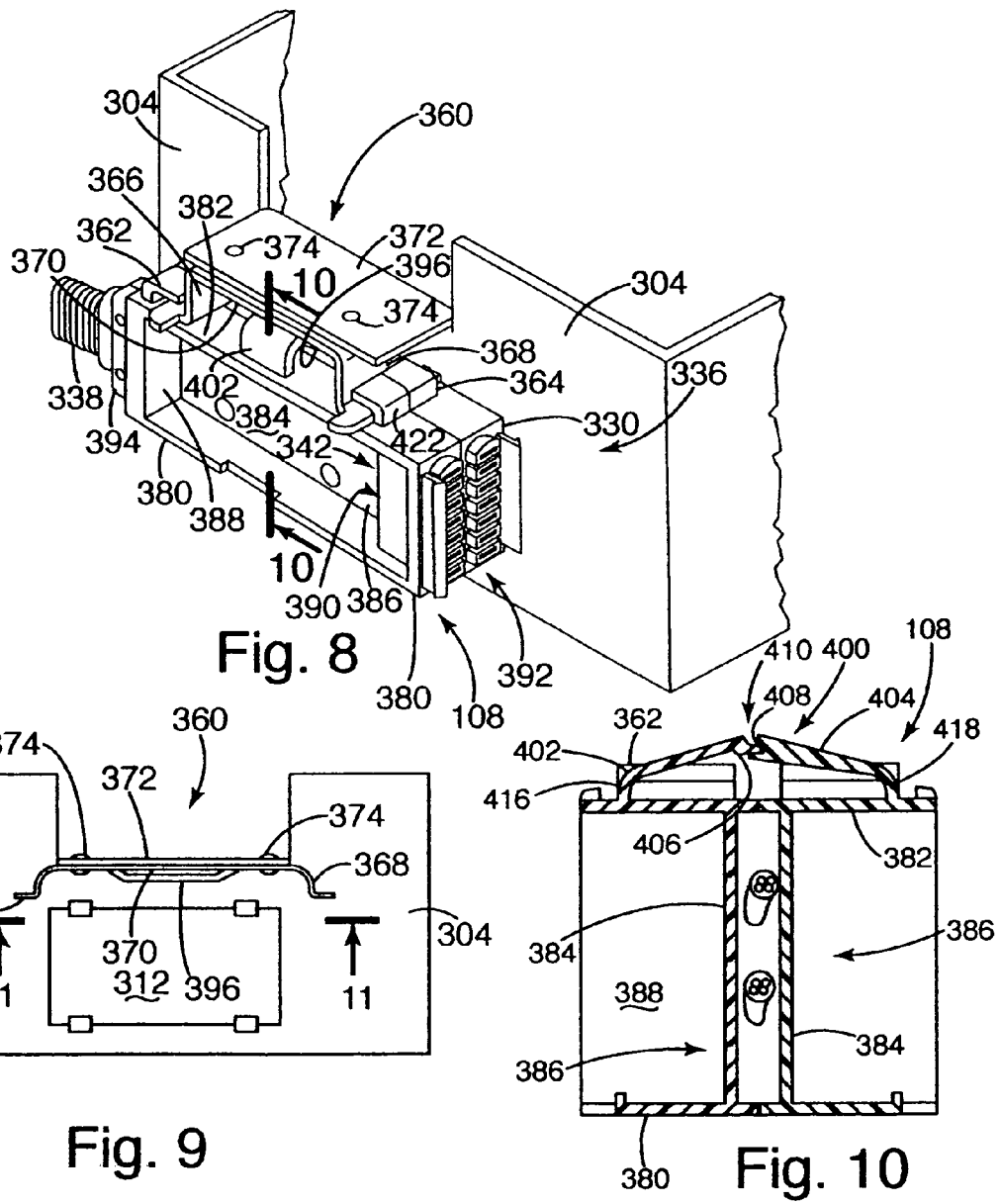
Fig. 8
Fig. 9
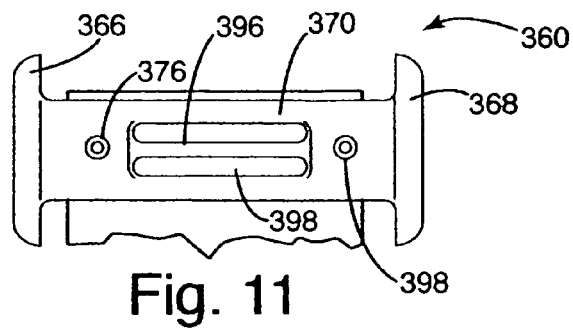
Fig. 10
Fig. 11

ELECTRICAL FLOOR ACCESS MODULE SYSTEM

CROSS-REFERENCE TO RELATED APPLICATIONS

This application is based upon and claims priority of International Patent Application No. PCT/US02/03424 filed Feb. 6, 2002, which is based upon and correspondingly claims priority of U.S. Provisional Patent Application Ser. No. 60/266,769 filed Feb. 6, 2001.

STATEMENT REGARDING FEDERALLY SPONSORED RESEARCH AND DEVELOPMENT

Not applicable.

REFERENCE TO A MICROFICHE APPENDIX

Not applicable.

BACKGROUND OF THE INVENTION

1. Field of the Invention

The invention relates to electrical power systems, and more particularly, to power systems having modules positioned beneath access flooring structures and the like.

2. Description of Related Art

The use of computers, sophisticated telecommunications equipment and other electronic devices is continuing to rapidly increase in commercial, industrial and other office environments. As a result, the importance of efficiently supplying power throughout these environments is also increasing. In particular, the use of modular office systems, with movable workstations and interior walls, has led to electrical systems far different and more sophisticated than the conventional designs comprising single or double unit electrical receptacles mounted in stationary walls, with the receptacles energized from incoming power supplies with cables extending through wall interiors. Such conventional single or double unit receptacles, particularly when used with modular office systems, were often located a substantial distance from electrical devices to be energized and would cause unsightly and sometimes dangerous arrays and result in entanglements of the electrical cords connected to the devices. Thereafter, pluggable units having a number of receptacles and a common power source cord to be plugged into the conventional utility outlet started to be used. Again, however, such units result in unsightly and entangled arrays of electrical device cords.

With the growth of the use of electrical power and modular office systems, it became known to employ removable wall panels or the like (which defined the workstation areas), with the panels or other structures having a raceway area for accommodating electrical wiring and electrical junction blocks near the floor or otherwise near the locations to be energized. Typically, junction blocks were mounted within the raceway areas by attaching them with various types of structural arrangements. During the past two decades, a substantial number of issued patents have been directed to concepts associated with these raceways and means for mounting electrical receptacles within the raceways.

Although the concept of employing raceways and electrical receptacles within modular wall panels and the like presented a substantial advance in electrical power supply design, this type of design does not provide a complete solution for all office system arrangements. For example, such panels can be relatively expensive and require a substantial number of different types of electrical components. Further, the particular electrical components to be employed can be dependent on the specific office system design. For example, many of these electrical system arrangements require different components dependent upon whether outlets are to be used on one side of a removable panel or the other side. Still further, many of these systems include relatively complex and expensive components to interconnect electrical power among various wall panels.

In addition to the foregoing problems, these electrified panels do not provide a complete solution to efficiency and aesthetics of power supply design when a more conventional office system design employs stationary walls with more permanent and fully enclosed offices. On the other extreme, in completely open office or "bullpen" design arrangements, no walls, removable or otherwise, are employed and the electrical system designer is again left with significant design problems.

In view of all of the foregoing, electrical system designers are again considering the use of electrical receptacles and similar electrical devices beneath access flooring. Such flooring arrangements allow power and signal cables to be placed beneath the floor in positions which do not interfere with the placement of walls or furniture. Further, such arrangements do not require any walls whatsoever, as required with raceways and receptacles mounted within removable walls. With the use of access flooring, the power and signal cables, along with other appropriate electrical devices, can be moved as the modular offices or other office design arrangements are modified.

Floor mounted devices for providing electrical service have been known for several decades. Early devices typically employed power supply cables extending underneath permanent flooring and interconnected to junction boxes or the like. Electrical receptacles would be mounted by some means within the junction boxes and electrically connected to the receptacle outlets.

For example, Stas, U.S. Pat. No. 2,996,566 discloses a floor-type outlet box for use within concrete flooring. The outlet box includes a duplex receptacle positioned so that the receptacle outlets extend vertically upward slightly beneath the floor level. A cover plate is hingedly mounted to the box and capable of being sealed to provide a water-tight housing flush with the concrete floor. Another, still earlier, disclosure of a junction box having electrical outlets for use in concrete floors is set forth in Buchanan, U.S. Pat. No. 1,928,198. The Buchanan patent is primarily directed to an arrangement for adjusting the position of the outlet box after the concrete floor is poured so as to compensate for any undesired displacement.

Several of the known arrangements for providing electrical receptacles in floors include arrangements for selectively positioning the receptacles between exposed and concealed positions. For example, Press, U.S. Pat. No. 3,622,684 discloses a floor receptacle mounting unit having electrical receptacles which can be rotated to a position in which the receptacles are exposed above the level of the floor or, alternatively, rotated to positions in which the receptacles are concealed below the floor level. Myers, U.S. Pat. No. 3,433,886 discloses an electrical junction box to be mounted flush with a floor. The junction box adjustably mounts an electrical service or receptacle box which is recessable below the floor surface through the use of adjusting machine screws. Other floor mounted electrical junction boxes and receptacles are shown in the following references: Kelly, U.S. Pat. No. 3,395,243; Wiesmann, U.S. Pat. No. 2,738,892; Fuller, U.S. Pat. No. 3,975,074; Guerrero, U.S. Pat. No. 2,811,574; MacLeod, Jr., U.S. Pat. No. 3,131,512; and Dubreulio, U.S. Pat. No. 3,794,956.

With respect to the previously cited references, most of these references are directed to floor mounted electrical receptacles and junction boxes to be mounted in permanent flooring. However, with the increase in use of modular offices, and for various other design and structural reasons, the use of access flooring is becoming more widespread. Such access flooring also allows the positioning of junction boxes and incoming power and signal cables to be placed beneath the floor after or during the design of the office systems (modular or otherwise) to be employed within the commercial or industrial environment. Such access flooring also allows for power and signal cables to be placed beneath the floor in a position which will not necessarily interfere with the placement of walls or, for that matter, furniture placement following complete office design. In addition, the use of such access flooring allows for junction boxes, electrical outlet boxes, power and signal cables to be selectively moved as the office systems are rearranged.

In known systems for utilizing electrical power with access flooring, power and signal cables are interconnected between incoming power supplies and junction or electrical receptacle boxes referred to herein as access floor modules. Appropriate office equipment is directly connected to receptacle outlets within the access modules which are designed specifically for receiving the receptacle outlets.

An example of a known access floor module is disclosed in Brownlie et al., U.S. Pat. No. 5,122,069. With reference to the drawings and the numerals disclosed in the Brownlie et al. patent, FIGS. 1–4 illustrate an access flooring module to be mounted in an opening 4 provided in an access floor. The module 2 is movable between an open position (FIG. 3) and a closed position (FIG. 4). Recesses 24 are provided so as to receive electrical components such as power sockets 34 or signal sockets 36 shown in FIG. 1. Metal plates 25 (shown in FIG. 2) selectively provide electrical contact with electrical components to be utilized with the module 2. In an alternative embodiment of the Brownlie et al. patent, FIG. 12 depicts interconnection of high tension cables 240 and low tension cables 241 to the rear of an alternative module 200. The high tension cable 240 is secured through a hard wire bracket 209, with the low tension cable 241 secured through a data bracket 211. Cable ties 242 are utilized to secure the cables to the rear of the module.

Although the prior art shows a number of designs for floor-mounted boxes capable of mounting electrical receptacles, an important aspect of floor-mounted arrangements is the overall "system." The overall system includes all of the junction boxes, electrical receptacle boxes and outlets, and the requisite cabling, including the means for interconnection of cabling. For example, if the system requires cables of different types with respect to lengths, connectors, and other structural considerations, the system designer's job is more complex, since the designer must essentially have a final system design before ordering the requisite cabling. Although an inventory of various cables may be ordered and stored, such an inventory may be expensive, take up valuable storage space and involve components which are never used. Still further, if a voluminous inventory is not desired, the designer must have exact details as to positioning of electrical outlets, system dimensions and other layout information before undertaking the process of ordering the cabling.

Other design and assembly issues for these types of electrical systems relate to system components other than cabling. For example, such systems may utilize one type of component for a junction box, and another type of component for mounting electrical receptacles. Again, such a structure suffers from the same problems previously described with respect to requiring various types of cables for the overall system.

In addition to issues associated with cabling, junction boxes and receptacle mounting structures, the means for interconnecting system components is also important. For example, if the interconnection of cables to other cables, or to junction boxes and the like, requires hard-wired connections, problems arise with respect to both design and assembly. More specifically, assembling electrical components beneath a floor structure by means of screws and bolts is an arduous task, even for the most skilled electrician.

In view of all of the foregoing, it would be advantageous to provide an electrical access floor system with substantial interchangability of components, reduction in the number and types of different components, and ease of interconnection of components and general assembly.

SUMMARY OF THE INVENTION

In accordance with the invention, an electrical system is provided which is adapted to be positioned under an access floor. The electrical system is further adapted for supplying electrical power from an interconnected power source to selectively interconnected electrical devices. The electrical system in accordance with the invention is advantageous in that it comprises a relatively few number of different types of components, allows for various types of electrical and communications outlets, facilitates rearrangement of the overall system configuration, and allows for ease of removable interconnection of system components. In this regard, certain components of the electrical system are substantially interchangeable with each other, including floor access modules and junction block cables.

The electrical system includes a plurality of substantially identical electrical access floor modules selectively spaced under the access floor. The modules provide conveniently located electrical power locations for energizing the electrical devices. The system also includes a plurality of substantially identical junction block cables for electrically interconnecting the access floor modules to the power source.

Releasable connection means are also provided, with the connection means being associated with the access floor modules and the junction block cables. The connection means provide for releasably and mechanically connecting each of the access floor modules to at least one of the junction block cables.

In addition to the foregoing, the electrical system also includes a plurality of electrical receptacle blocks. Each of the receptacle blocks includes at least one electrical receptacle which is electrically connectable to one or more of the electrical devices for supplying electrical power to the devices. Each of the receptacle blocks is further electrically connectable to the junction block cables.

Further in accordance with the invention, the electrical floor access modules are substantially interchangeable with each other, and the junction block cables are substantially interchangeable with each other so as to provide the electrical system as a modular system which is adapted to be sized and configured in a manner which does not require any substantial amount of different types and/or sizes of cables and other electrical equipment.

The electrical receptacles include a first predetermined terminal connection arrangement. Each of the junction block cables includes a junction block connectable to an access floor module through the releasable connection means. Each of the junction block cables includes a second predetermined terminal connection arrangement for electrically and releasably engaging the first predetermined terminal connection arrangement. In addition, each of the junction block cables also includes an external third terminal connection arrangement.

The junction block cables each further comprises an electrical conduit section and a terminating connector which is electrically connected to the second terminal connection arrangement of the junction block of the junction cable through the conduit section. The terminating connector of each of the junction block cables is electrically and releasably engagable with a third terminal connection arrangement of another of the junction block cables.

The electrical system in accordance with the invention can also include a plurality of extension cables, with each of the extension cables being electrically connectable to the junction block cables. At least one of the extension cables can include a terminating connector electrically and releasably engagable with a third terminal connection arrangement of a junction block cable. At least one of the extension cables can also include a double terminating connector at one end of the extension cable, for electrical interconnection with two of the junction block cables.

The electrical system in accordance with the invention can also include a power input cable connectable to the power source, and also connectable to one of the terminating connectors of one of the junction block cables. Also, at least one of the electrical receptacle blocks can include duplex electrical receptacles. Further, at least one of the electrical receptacle blocks can include communication ports. Still further, the electrical system can include voice/data or other communication ports, in addition to means associated with at least one of the access floor modules for mechanically and releasably connecting at least one of the communication ports to the at least one access floor module.

The electrical system in accordance with the invention can also include conventional communications element and mounting brackets, which are mechanically connectable to at least one of the access floor modules. Further, at least one of the junction blocks can be double sided so as to mechanically and electrically connect at least one of the electrical receptacle blocks to either side of the junction block. Still further, the electrical conduit section of at least one of the junction block cables can be adjustable in length.

The electrical system in accordance with the invention can be sized and configured so that multiple junction blocks associated with multiple junction block cables may be mechanically and releasably interconnected to a single access floor module, with the multiple junction blocks being electrically interconnected to each other. Still further, the third terminal connection arrangement of at least one of the junction blocks can include a connector block pair connectable to a terminating connector of each of two other junction block cables. Further, at least one of the junction blocks can include a recessed area for releasably engaging at least one of the receptacle blocks.

Each of the junction blocks associated with one of the junction block cables can be permanently connected to an associated one of the electrical conduit sections of the junction block cable. Each of the terminating connectors associated with the junction block cable can be permanently connected to an associated electrical conduit section of the corresponding junction block cable. Still further, each of the floor access modules can include a floor component formed in a rectangular, boxed-like structure having an open top portion.

BRIEF DESCRIPTION OF THE DRAWING

The invention will now be described with reference to the drawing, in which:

FIG. 8 is a perspective view of the junction block portion of the junction block cable shown in FIG. 6, and further showing the releasable interconnection of the junction block to the access floor module component;

FIG. 9 is an elevation view of one side of the access floor module component to which the junction block of the junction block cable is releasably interconnected, and specifically showing the mounting bracket arrangement of the access floor module, with the junction block cable removed;

FIG. 10 is a side elevation view of the junction block of the junction block cable releasably interconnected to the access floor module component, through lines 10—10 of FIG. 8; and FIG. 11 is an underside view of the mounting bracket for the releasable interconnection of the junction block to the access floor module, shown through lines 11—11 of FIG. 9;

DESCRIPTION OF THE PREFERRED EMBODIMENT

Figure 1:
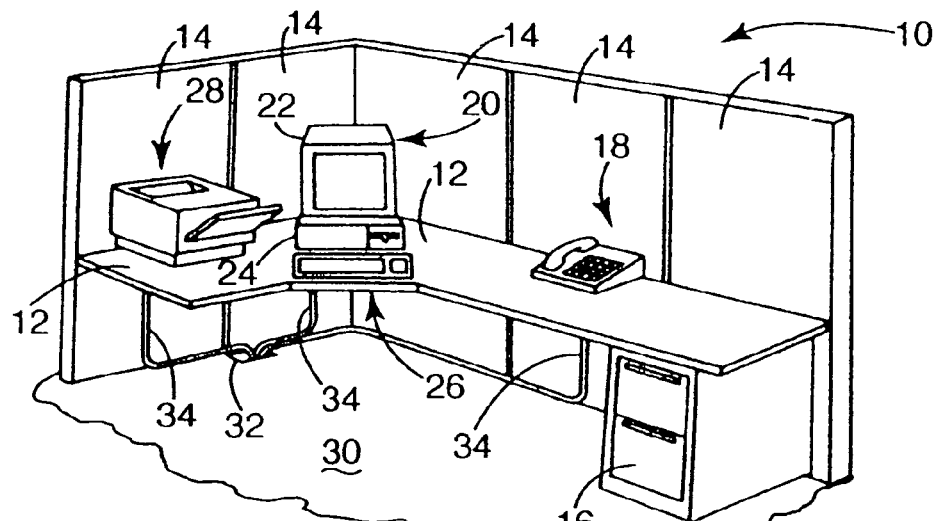
FIG. 1 is a partial, perspective view of a typical workstation employing an electrical access floor system for electrically interconnecting various equipment to an incoming power supply under an access floor.

The principles of the invention are disclosed, by way of example, in an electrical access floor system as depicted in FIGS. 1–11. The electrical access floor system provides for readily accessible access floor modules having means for selectively mounting and positioning electrical receptacle outlets, communications outlets and similar devices. The floor access system also provides for facilitating interconnection of cables and receptacles without hard-wired interconnections. In addition, the electrical access floor system uses a relatively minimum number of different types of electrical components and readily provides component interchangeability and facilitates system reconfiguration.

The access floor system as described in subsequent paragraphs herein is adapted for use in various types of office and other commercial and industrial environments. For example, such an office environment can include a workstation such as workstation 10 illustrated in FIG. 1. As shown therein, the workstation 10 can include a modular office arrangement comprising worksurfaces 12 removably mounted by conventional means (not shown) to modular and moveable wall panels 14. The workstation 10 can also include conventional components such as storage drawers 16 and like equipment. In addition, the workstation 10 can include equipment requiring electrical interconnections, such as the telecommunications station 18 and personal computer 20, with the personal computer 20 comprising a display monitor 22, processor 24 and keyboard 26. In addition, other devices such as printer 28 may also be employed.

As previously described in the section entitled "Description of the Related Art," modular office panels such as panels 14 may often include electrical raceways for mounting electrical receptacles or the like (not shown) near the lower portions or in other areas of the panels 14. As an alternative, workstation 10 may also be employed in an office environment having access flooring such as access floor 30 illustrated in FIG. 1. The access floor 30 can include floor apertures such as floor aperture 32 opening to an area below the floor 30. Access floors such as floor 30 are well known in building and office system design. The floor aperture 32, as described subsequently herein, can provide access to electrical and communications outlets for energizing the various electrical equipment of the workstation 10. Interconnection to an electrical power source is provided by means of electrical and communications cords 34 also illustrated in FIG. 1. The cords 34 can be in the form of conventional insulated electrical wires carrying AC power to components such as the printer 28. The cords 34 may also comprise communication lines carrying voice or other data signals from equipment such as the telecommunications station 18 and personal computer 20.

Figure 2:
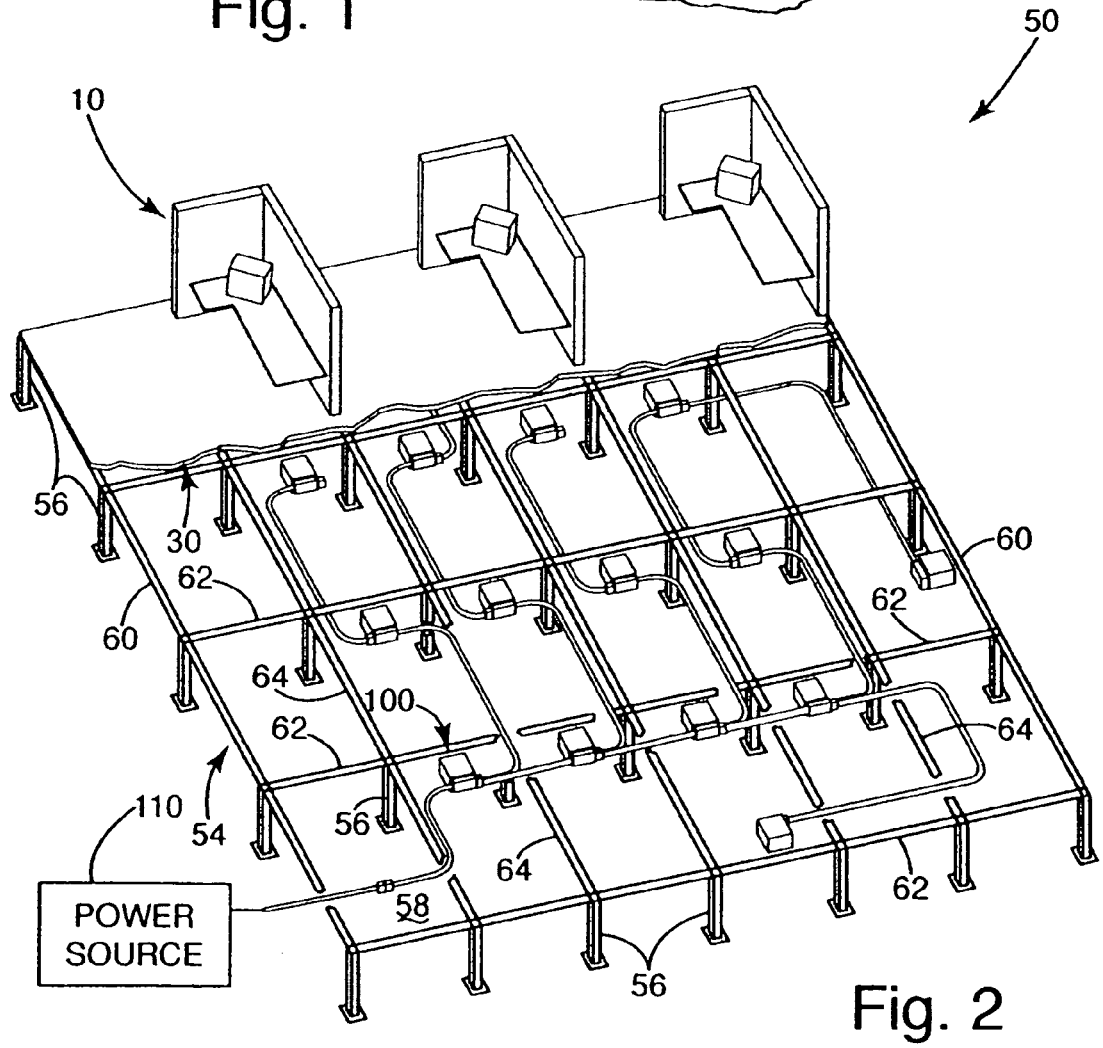
FIG. 2 is a perspective view of an under floor electrical system arrangement in accordance with the invention, showing a partially cut-away access flooring.

The workstation 10 with the access floor 30 can be employed within a modular office system, such as the system 50 illustrated in FIG. 2. As shown in FIG. 2, the office system 50 may comprise several of the workstations 10, in addition to other work areas (not shown) having more of an "open" environment such as conventional desks and the like. Although not expressly shown in FIG. 2, the desk areas 52, as well as the workstations 10, would include electrical cords and communication lines, such as the cords and lines 34 shown in FIG. 1, extending from electrical equipment at the desks and workstations 10 through apertures (not shown in FIG. 2) extending through the access floor 30.

As further shown in FIG. 2, the access floor 30 can essentially comprise a "raised" floor structure. The raised access floor 30 can be mounted by any suitable means to a floor mounting system 54. The floor mounting system 54 can include vertical support posts 56 mounted in an upright orientation and secured by any suitable means to a permanent floor or base structure 58. The floor support system 54 can include opposing end braces 60. Mounted between the opposing end braces 60 are spaced apart longitudinal braces 62. The opposing end braces 60 and the two longitudinal braces 62 at opposing far sides of the floor support system 54 essentially form a perimeter (in the case of the structure shown in FIG. 2, a rectangular perimeter) for the support system 54. Mounted perpendicular to the longitudinal braces 62 are spaced apart transverse braces 64. The braces 62 and 64 form square or rectangular sections of the access floor 30. In many of these types of raised access floor systems, the rectangular sections formed by the braces 62 and 64 are of a size so as to appropriately position and support a corresponding unitary section of the access floor 30.

It should be emphasized that the particular access floor 30 and the individual elements of the support system 54 do not form any of the principal concepts of the invention. Electrical access floor systems in accordance with the invention may be utilized with varying types of floor structures. However, systems in accordance with the invention are particularly well suited for access flooring systems having removable sections and the like.

Figure 3:
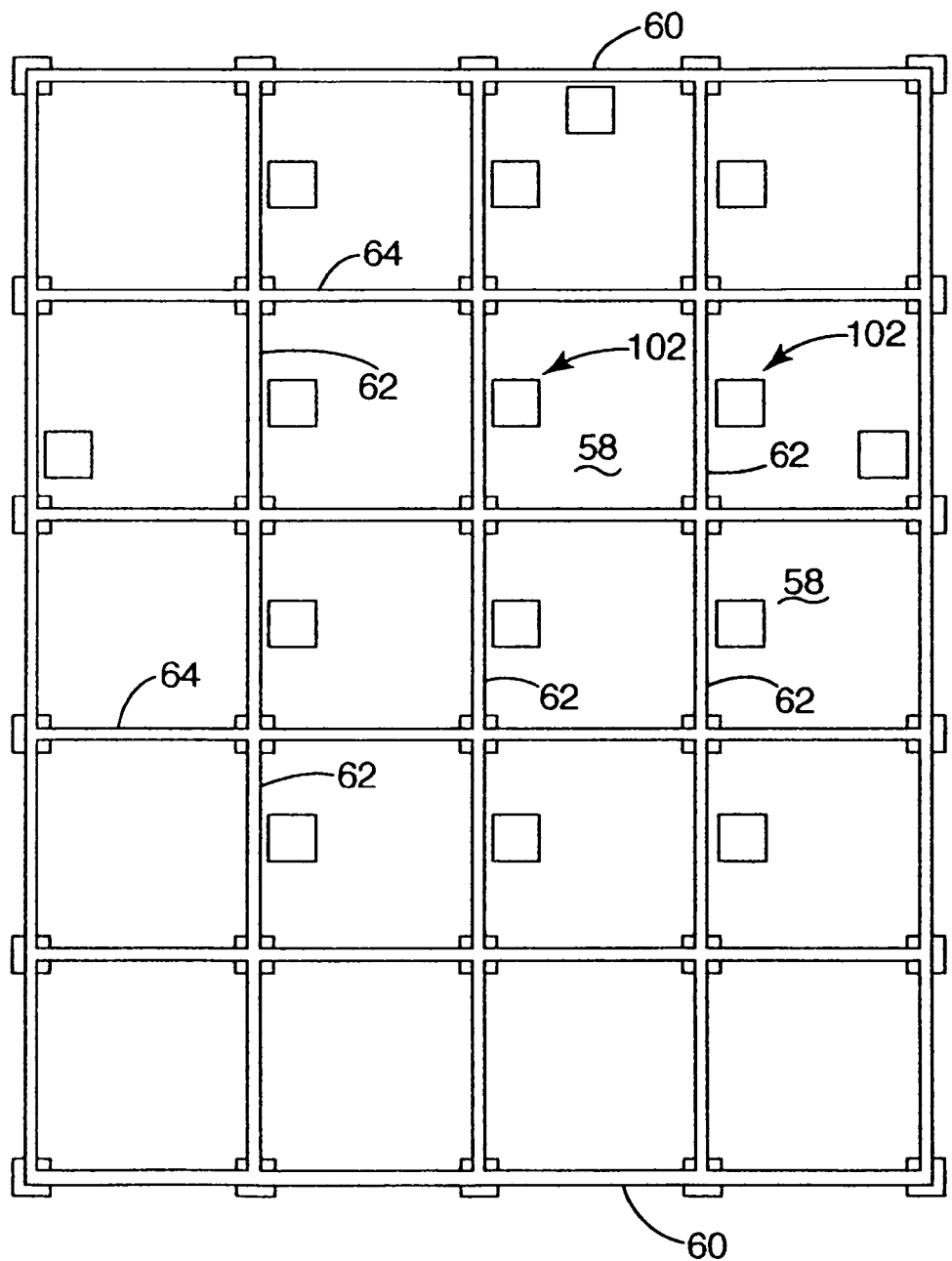
FIG. 3 is a plan view of the under floor area of FIG. 2 (with the floor almost completely cut-away except for supporting braces), showing relative positioning of electrical access floor module components.

The general structure of an embodiment of an electrical access floor system in accordance with the invention will now be described with reference to FIGS. 2, 3 and 4. As shown in these drawings, an electrical floor access system 100 is employed under the access floor 30 in a manner so as to be accessible to the electrical equipment of the office system 50. A primary component of the electrical system 100 comprises an access floor module 102. The electrical system 100 comprises a number of access floor modules 102 positioned beneath the access floor 30 and mounted by any suitable means (not shown) above the permanent flooring 58.

As described in subsequent paragraphs herein, the access floor modules 102 comprise structures to which electrical receptacles and communication outlets may be mounted. That is, the access floor modules 102 essentially comprise a basic "building block" of the electrical system 100. When the general locations of the workstations 10, desks 52 and other components of the office system 50 are determined by the office system designer, a general layout can be provided as shown in FIG. 3 for the access floor modules 102. That is, it would typically be preferable to have at least one access floor module 102 adjacent each of the workstations 10 and desks 52. Accordingly, FIG. 3 essentially illustrates a "starting point" for the overall configuration of the electrical system 100 after the general layout of the office system 50 has been determined.

After the appropriate positioning of the access floor modules 102 has been determined, an appropriate and efficient cabling interconnection in accordance with the invention can be determined. FIG. 4 illustrates a relatively simplified and somewhat symbolic block diagram format for the access floor modules 102 and the appropriate cabling interconnections. Details of the access floor modules 102 and the cabling arrangements will be set forth subsequently herein. The purpose of FIGS. 2–4 is to provide a general overall view of the system concept associated with the electrical system 100 in accordance with the invention.

In addition to the access floor modules 102, a basic element of the electrical system 100 comprises the junction block cable 104. As will be described in greater detail herein, each of these junction block cables 104 includes a connector 106 permanently connected with the cable at one terminating end thereof. The connector 106 is capable of direct and releasable electrical interconnection to another junction block cable 104. As described in subsequent paragraphs herein, the electrical interconnection between junction block cables 104 can be made without requiring any tools or "hard" wiring.

At the opposing ends of each of the junction block cables 104 is a permanently connected junction block 108. As with the connectors 106, details of an exemplary embodiment of the junction block 108 will be described in subsequent paragraphs herein. The junction blocks 108 can be removably mounted to a selected access floor module 102. The junction blocks 108 serve to provide electrical interconnection and mounting for electrical receptacles and similar devices for direct interconnection with the electrical cords and communication lines 34 previously described with respect to FIG. 1. Of particular advantage, and as also further described in subsequent paragraphs herein, each of the junction blocks 108 includes an electrical structure which is capable of electrical interconnection to a connector 106 of a junction block 108 of another junction block cable 104.

Figure 4:
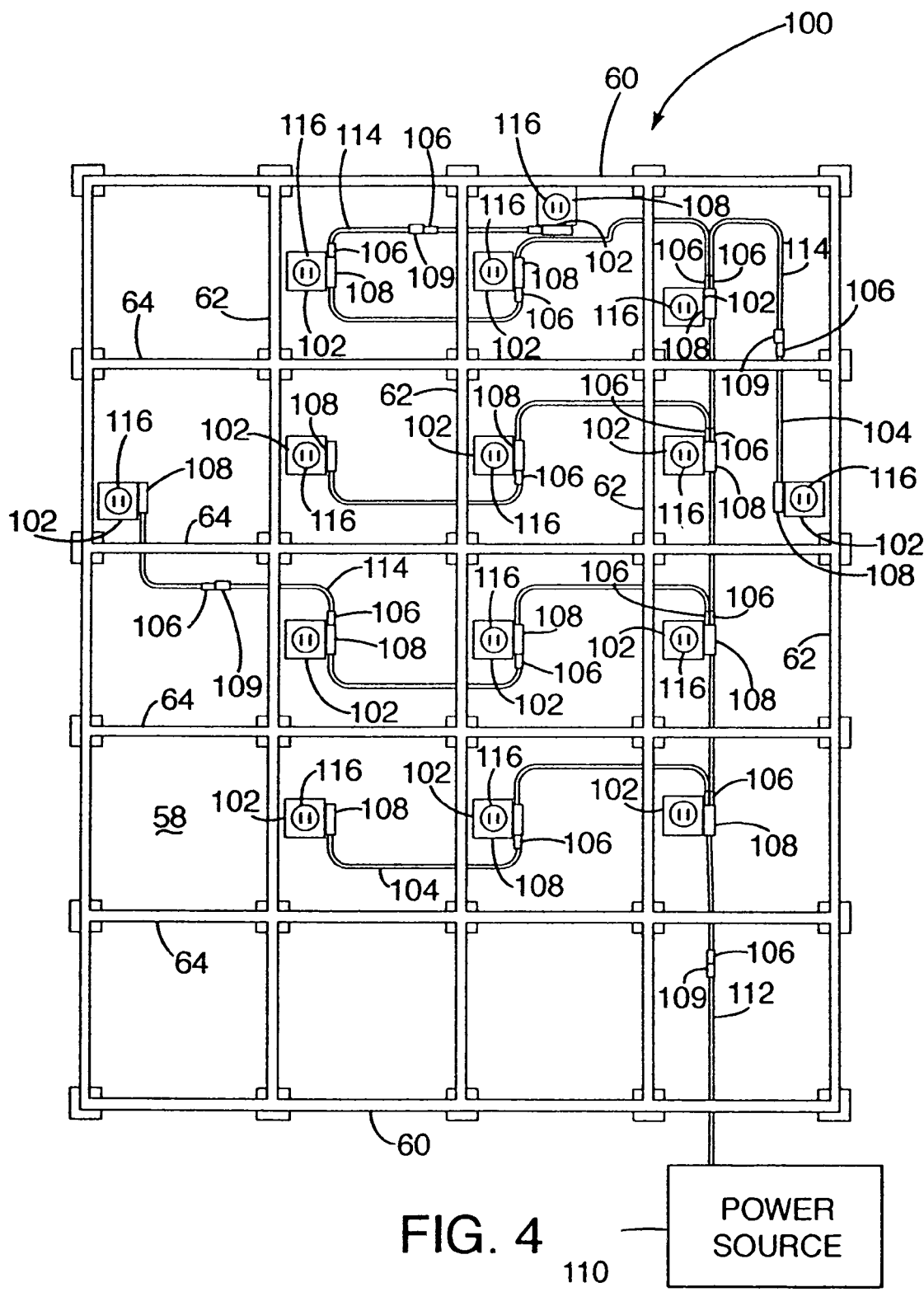
FIG. 4 is a plan view showing an exemplary embodiment of cabling interconnections for the access floor modules illustrated in FIG. 3.

FIG. 4 also illustrates, in symbolic form, a power supply source 110 can comprise an input location for conventional utility power. To interconnect the electrical system 100 to the power supply input 110, a power input cable 112 as shown in FIG. 4 can be utilized. The cable 112 can include an electrical connector 107 capable of electrically mating with the connector 106 of one of the junction block cables 104. Accordingly, the cable 112 can be interconnected to the power supply input 110 and one of the junction block cables 104 through connectors 106 and 107. In this manner, external utility power can be initially supplied to the electrical system 100.

In accordance with the foregoing, the electrical system 100 can provide a number of locations for supplying electrical power to the workstations 10 and desks of the office system 50 shown in FIG. 1. Such power can be provided with a relatively minimum number of different types of components, namely the access floor modules 102 and junction block cables 104. The system 100 illustrated in FIG. 4 will again be referred to after a more detailed description is provided of the access floor modules 102 and junction block cables 104.

FIG. 4 also illustrates one other type of cable-connector element. More specifically, as shown with respect to the majority of the access floor modules 102 in FIG. 4, interconnections can be made from one access floor module 102 to another access floor module 102 through the use of a single junction block cable 104. However, in certain instances, the distance between relatively adjacent floor access modules 102 may be longer than a conventional and uniform length of a junction block cable 104. In these situations, a second type of cable, referred to herein as an extension cable and shown as extension cables 114 in FIG. 4, may be employed. The extension cables 114 differ from the junction block cables 104 in that the extension cables 114 do not have any junction blocks 108 at their terminating ends. Instead, the extension cables 114 comprise a connector 106 electrically interconnected to one of the terminating ends of the cable 114, while a somewhat different electrical connector 109 is connected to the other of the terminating ends of the cable 114. As will be described in subsequent paragraphs herein, the electrical connector 109 includes a pair of connector terminals capable of electrical interconnection to a connector 106 of one of the junction block cables 104 or, alternatively, to a connector 106 of another of the extension cables 114.

FIG. 4 also illustrates, in symbolic and block diagram format, the location of electrical receptacle outlets shown as outlets 116 in FIG. 4. The outlets 116 may be in the form of conventional single or duplex electrical receptacles, or may also take the form of other types of communication interconnections. As will be described in subsequent paragraphs herein, the outlets 116 are actually mounted within the junction blocks 108 in a manner so as to facilitate assembly and disassembly.

Figure 5:
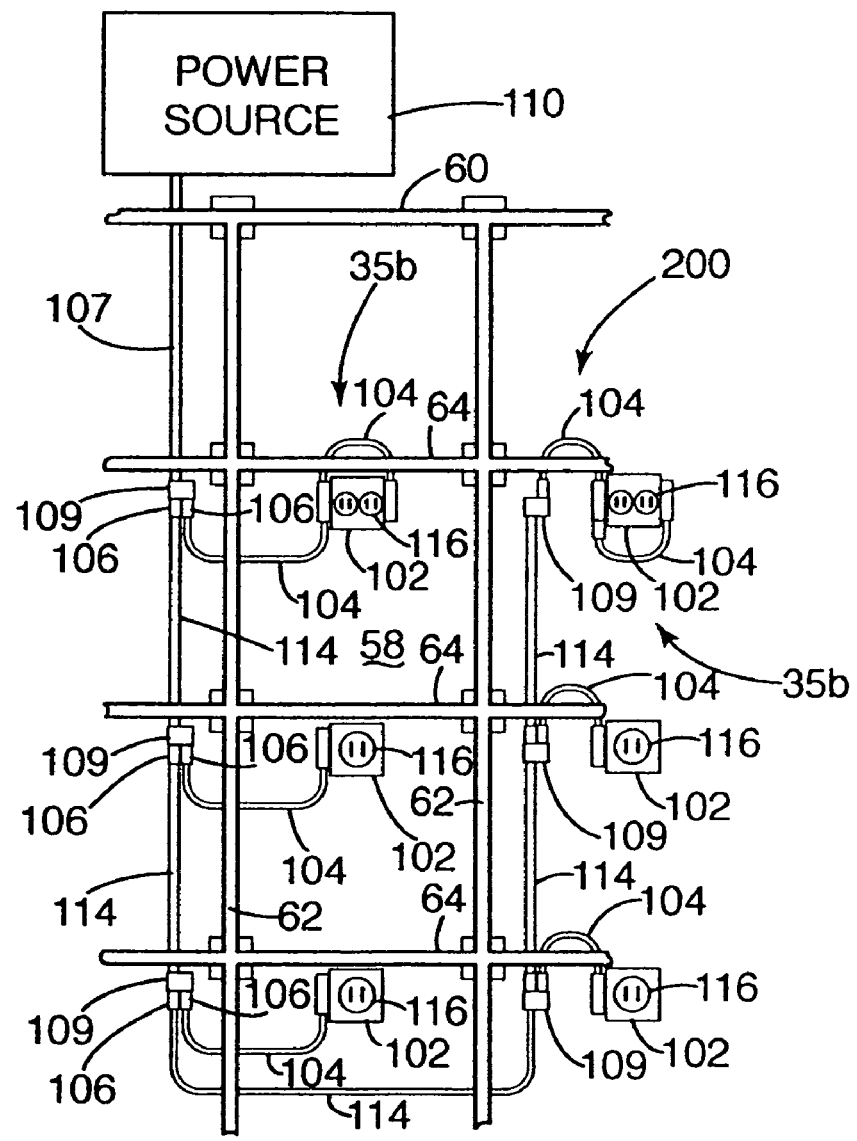
FIG. 5 is a plan view of an under floor area (with the floor cut-away except for supporting braces) of an alternative embodiment of a configuration of access floor modules and cabling interconnections therefor in accordance with the invention.

FIG. 5 illustrates an alternative embodiment of an electrical access floor system in accordance with the invention. In this particular embodiment, shown as electrical system 200 in FIG. 5, a somewhat different arrangement of access floor modules 102 is provided, relative to the system 100 illustrated in FIG. 4. As with the electrical system 100 illustrated in FIG. 4, the electrical system 200 also includes access floor modules 102, with the use of junction block cables 104. However, in the particular arrangement shown as electrical system 200 in FIG. 5, the extension cables 114 briefly introduced with respect to FIG. 4 are used fairly extensively. As previously briefly described with respect to FIG. 4, each of the extension cables 114 includes an electrical connector 106 at one terminating end thereof. The electrical connector 106 associated with extension cable 114 corresponds to the electrical connectors 106 previously described with respect to the junction block cables 104. However, unlike the junction block cables 104, the other terminating end of the extension cables 114 include a double connector 109. The double connectors 109 have the capability of interconnecting one or two other cable elements through connectors corresponding to connectors 106 previously described with respect to the junction block cables 104 and extension cables 114. Accordingly, each extension cable 114 has the capability of interconnection to one or two other extension cables 114 or junction block cables 104, or a combination of the two. Again, after describing in greater detail the individual components of the electrical access floor systems in accordance with the invention, the structural interconnection configurations of the electrical systems 100 and 200 will again be referenced.

Figure 6:
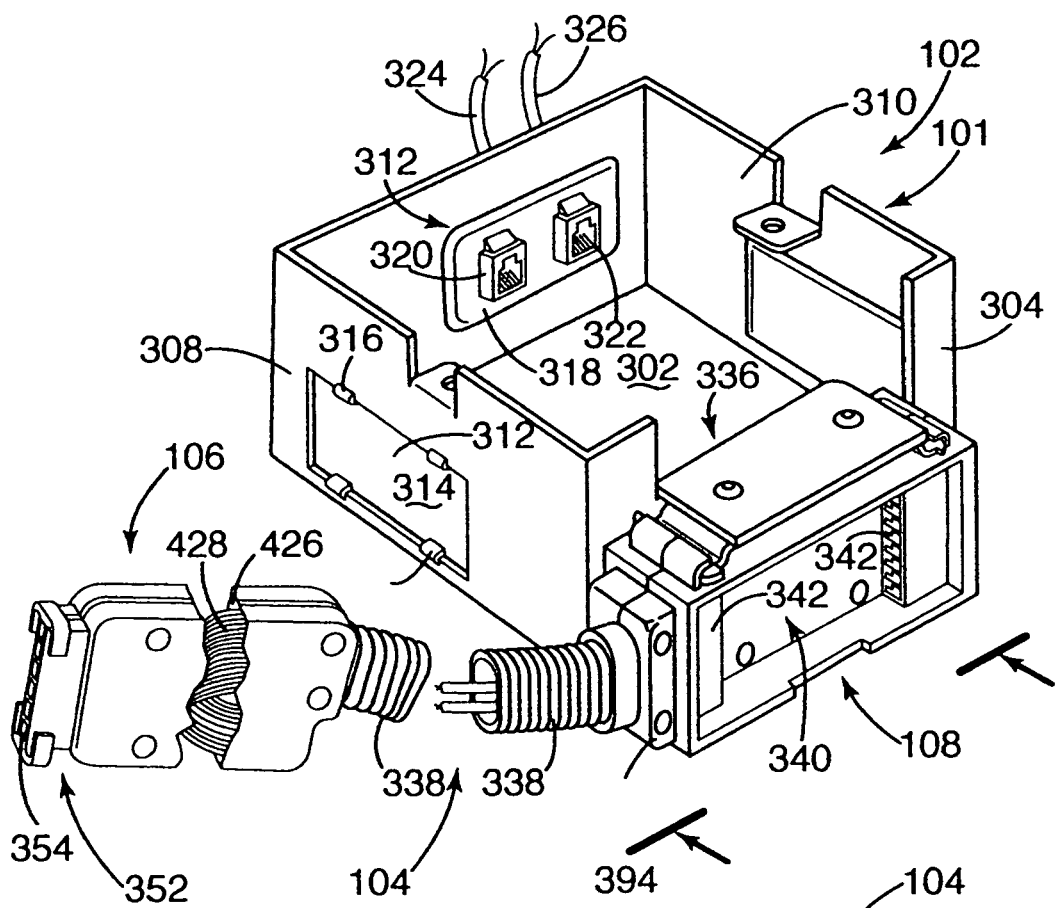
FIG. 6 is a perspective view of an access floor module in accordance with the invention, with the access module having an outlet receptacle pair, a voice/data communications outlet pair and a junction block cable releasably connected to the access module.
Figure 7:
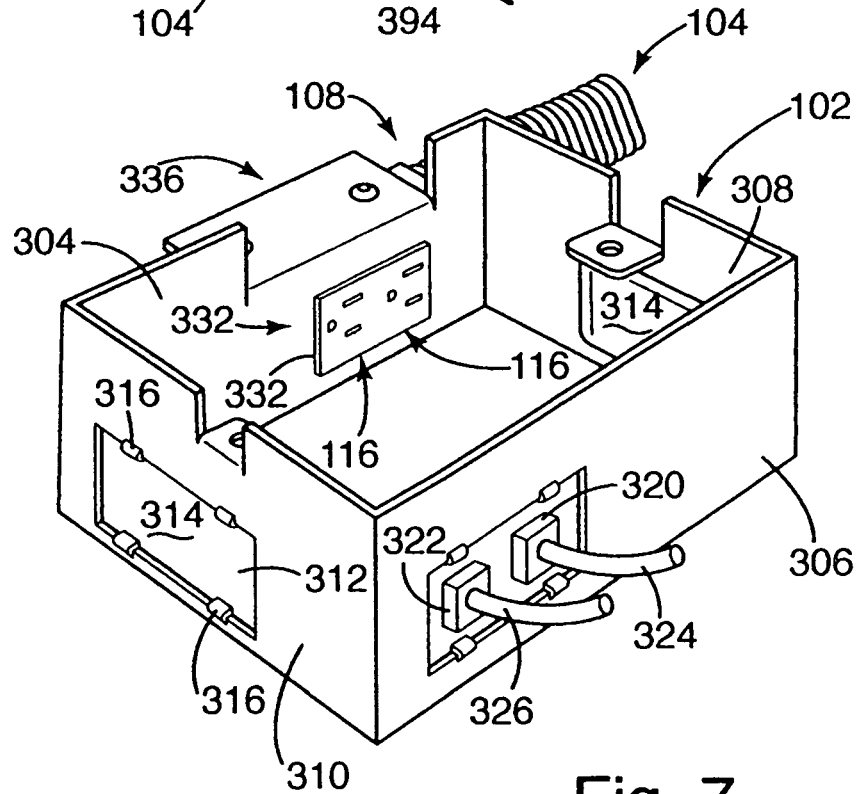
FIG. 7 is another perspective view of the access floor module shown in FIG. 6, with the view essentially opposing the view of FIG. 6, and specifically showing the outlet receptacle pair in the rear portion of the voice/data outlet pair.

FIGS. 6 and 7 illustrate perspective views of the access floor module 102 with an attached junction block cable 104. The access floor module 102 comprises an access floor component 101 which is essentially formed in a rectangular, box-like structure with an open top portion. The access floor component 101 comprises a bottom floor portion 302, along with an integrally connected front portion 304 and rear portion 306. The front portion 304 and rear portion 306 are each positioned vertically upright and perpendicular to the floor portion 302. The access floor module 102 also includes a first end portion 308 and a second opposing end portion 310. Each of the end portions 308, 310 is also vertically upright and extends perpendicular to the floor portion 302. In accordance with the foregoing, the access module 102 forms the access module component 101 in the rectangular, box-like structure.

Positioned in each of the front and rear portions, 304, 306 and end portions 308, 310 is a rectangular aperture 312 positioned as desired for purposes of providing mounting and electrical access positions as described in subsequent paragraphs herein. In the particular embodiment of the access floor module 102 as shown in FIGS. 6 and 7, the rectangular apertures 312 in the first end portion 308 and second end portion 310 are concealed by covers 314. The covers 314 are snapped or otherwise secured into the rectangular apertures 312 by means of bendable fittings 316. When the rectangular apertures 312 with the covers 314 are to be utilized for electrical components, the fittings 316 can be bent or otherwise disconnected from the interconnected potions of the access module 102, so as to remove the covers 314 and expose the apertures 312.

As further shown in FIGS. 6 and 7, for purposes of interconnection of telecommunications facilities or the like, the rectangular aperture 312 in the rear portion 306 can be fitted with a conventional communications element mounting bracket 318. The mounting bracket 318 will be described in greater detail in subsequent paragraphs herein. In general, the mounting bracket 318 can be employed to mount communications connectors such as the voice communications connector 320 and the data communications connector 322. The communications connectors 320, 322 can be connected to corresponding voice communications line 324 and data communications line 326, respectively. The communications lines 324, 326 are conventional in nature and can be connected to external communications facilities, such as incoming telephone lines and the like. Internally, with the floor access module 102 appropriately located beneath communications equipment within the office system, communications lines, such as the lines 34 illustrated in FIGS. 1 and 2, can be dropped through the floor 30 and interconnected to the appropriate voice communications connector 320 and data communications connector 322 internal to the structure of the floor access module 102. For simplicity of illustration, these communication lines running from the appropriate office equipment to the communications connectors 320, 322 are not illustrated in FIGS. 6 and 7.

In addition to the access floor module 102 illustrated in FIGS. 6 and 7, FIGS. 6 and 7 also illustrate a junction block cable 104 interconnected with the access floor module 102. The junction block cable 104 includes a junction block 108. Electrically interconnected to the junction block 108 is an electrical receptacle block 332. The electrical receptacle block 332 is illustrated only in FIG. 7 of the drawing of FIGS. 6 and 7. As shown specifically in FIG. 7, the electrical receptacle block 332 includes a pair of receptacle outlets 116 conventional in design and structure. The electrical receptacle block 332 is coupled to the junction block 108, and the junction block 108 is releasably mounted to the access floor module 102, in a manner such that the receptacle outlets 334 face inwardly into the interior of the access floor module 102.

The junction block 108 is releasably mounted to the access floor module 102 by means of a mounting assembly 336. Details of the junction block 108, electrical receptacle block 332 and mounting assembly 336 will be described in subsequent paragraphs herein with respect to more detailed illustrations.

The junction block cable 104 also includes an adjustable cable or conduit section 338 electrically connected to one end of the junction block 108. The junction block 108, as will be apparent from the description of additional illustrations in subsequent paragraphs herein, is double sided and includes, on each side, an opening 340 (only one of which is shown in FIGS. 6 and 7). Positioned in the opening 340 is a set of connectors 342 which are adapted to be interconnected to corresponding connectors of one of the electrical receptacle blocks 332. The particular opening 340 shown in FIG. 6, which extends external from the interior of the access floor module 102, is illustrated without any corresponding electrical receptacle block 332. The interconnection of the electrical receptacle blocks 332 with the connectors 342 will be described in greater detail with respect to additional illustrations in subsequent paragraphs herein.

The adjustable cable or conduit section 338 is connected at its end, opposing the end connected to the junction block 108, to a male connector block 106. The male connector block 106 includes, at its terminating end, a male connector 352 which is provided with a plurality of male connector terminals 354. The male connector block 106 is adapted to be interconnected to appropriate energy sources so as to provide electrical power to the electrical receptacle block 332 through the junction block 108 and adjustable cable or conduit section 338. The male connector block 106 will be described in greater detail in subsequent paragraphs herein with respect to further illustrations. In particular, the male connector block 106 is adapted to be interconnected directly to an incoming power feed cable, such as the cable 112 illustrated in FIG. 4. In this manner, power is provided directly from the power feed cable 112 to the particular electrical receptacle block 332 associated with the corresponding junction block 108. In addition, the male connector block 106 is also adapted, as described in subsequent paragraphs herein, to be electrically and releasably mechanically connected directly to a junction block 108 associated with another junction block cable 104 interconnected with a different access floor module 102. This type of interconnection is also shown in the particular access floor system of FIG. 4. Still further, the male connector block 106 may be connected to another junction block 108, where such other junction block 108 is also interconnected to the same access floor module 102 as is interconnected the junction block 108 associated with the particular junction block cable 104 having the male connector block 106. Such a configuration is illustrated by the particular access floor modules 102 and junction block cables 104 identified by reference numerals 356 in FIG. 5. Still further, the male connector block 106 can also be interconnected to a female connector block of an extension cable, such as the extension cables 114 also illustrated in FIG. 5. An example of this type of interconnection is shown by the combined extension cable 114, junction block cable 104 and floor access module 102 identified by reference numeral 358 in FIG. 5.

As earlier described, with respect to FIGS. 6 and 7, the access floor module 102 can include a mounting assembly 336, with respect to each of the junction block cables 104 to be interconnected to the access floor module 102. The mounting assembly 336 shown in FIG. 6 with respect to the embodiment of the access floor module 102 illustrated therein is further illustrated in FIGS. 8–11. FIG. 8 illustrates a perspective view of the mounting assembly 336, with an interconnected junction block 108. Correspondingly, FIG. 10, a sectional view, also shows the mounting assembly 336 with the junction block 108. FIG. 9, for purposes of illustration, illustrates a front, sectional view of the mounting bracket of the mounting assembly 336, with the junction block 108 removed.

With reference to FIGS. 8–11, the mounting assembly 336 provides attachment of the junction block 108 to a mounting bracket 360 by means of L-shaped mounting lugs 362 and 364 engaging corresponding L-shaped support brackets 366 and 368, respectively. The support brackets are integral with or otherwise connected to a horizontal member 370 which extends across the top of and between the L-shaped support brackets 366 and 368.

The horizontal member 370 is connected below and to a horizontal supporting tab 372. The supporting tab 372 is rectangular in structure and formed as an integral piece cut and bent from the front portion 304 illustrated in FIG. 6. The supporting tab 372 is bent at a right angle relative to the remaining part of the front portion 304, and includes a pair of apertures (not specifically shown in the drawings) through which a pair of rivets 374 or other appropriate connecting means are received. The rivets 374 extend through apertures 376 disposed in the horizontal member 370. In this manner, the horizontal member 370, with integrally connected L-shaped support brackets 366 and 368, is secured in an abutting relationship immediately below the horizontal supporting tab 372.

With reference to FIGS. 8 and 10, the junction block 108 comprises a housing having a lower wall 380, upper wall 382 and middle walls 384 which serve to provide a spatial area 386 and a similar area on the opposite side of the middle walls 384. The spatial area 386 is also formed by a left side wall 388 and a right side wall 390. As described in subsequent paragraphs herein with respect to further illustrations of the drawing, the spatial area 386 shown in FIG. 8 and the like spatial area on the opposing side of the junction block 108 may be used to accommodate electrical receptacle blocks, such as the electrical receptacle block 332 illustrated in FIG. 7. Such an electrical receptacle block is energized through interconnection with the connectors 342 positioned within the spatial area 386. Again, the connectors 342 and the interconnection of an electrical receptacle block will be described in greater detail in subsequent paragraphs herein.

In addition to the connectors 342, the junction block 108 also includes a female connector block pair 392 extending outwardly from the right side wall 390. The female connector block pair 392, and the use thereof, is described in subsequent paragraphs herein with respect to further illustrations of the drawing. In particular, each of the female connector blocks of the female connector block pair 392 is adapted to be electrically interconnected to a male connector, such as the male connector 352 illustrated in FIG. 6.

Extending outwardly and externally from the left side wall 388 is the adjustable cable or conduit section 338 interconnected in an electrical manner to the junction block 108 through the cable connector block 394. The cable connector block 394 and the adjustable cable or conduit section 338 are electrically interconnected to the connectors 342 and the female connector block pair 392 as described in subsequent paragraphs herein.

The junction block 108 is maintained in a stationary and releasably secured position relative to the L-shaped support bracket 366 and L-shaped support bracket 368 by engagement of an arcuate retaining tab 396. As shown in FIGS. 9 and 11, the arcuate retaining tab 396 is preferably integral with the horizontal member 370 and comprises a tab which extends downwardly in a curved manner within a rectangular aperture 398 formed in the central portion of the horizontal member 370.

The arcuate retaining tab 396 extending downward from the horizontal member 370 is adapted to engage a latching device 400 which is disposed between the mounting lugs 362, 364 extending upwardly from the upper wall 382 of the junction block 108. The latching device 400 comprises a pair of interlocking latch members 402 and 404. The interlocking latch member 402 is provided with an elongated member such as tongue 406 as primarily shown in FIG. 10. Correspondingly, the interlocking latch member 404 is provided with an appropriate opening such as the groove 408 for purposes of interlockingly receiving the tongue 406. As shown in both FIGS. 8 and 10, the interlocking latch members 402, 404 are integrally formed on the top of the upper wall 382 of the junction block 108, and may be constructed of a resilient plastic material such as polycarbonate which provides a restoring force on the interlocking latch members 402, 404. A channel 410 is defined by the interlocking members 402, 404 for engaging the arcuate retaining tab 396. The latching device 400 may be disengaged from the retaining tab 396 by depressing either of the interlocking latch members 402, 404, which causes both of the interlocking latch members 402, 404 to be depressed and causes the arcuate retaining tab 396 to be disengaged from the channel 410. The junction block 108 may then be removed from the L-shaped supporting brackets 366 and 368 by pulling the junction block 108 outwardly from the tab 372. Similarly, the junction block 108 may be installed and releasably interconnected with the access module 102 by slidingly engaging the attachment lugs 362 and 364 with the L-shaped support brackets 366 and 368. The sliding motion on the L-shaped support brackets 366 and 368 will result in engagement of the latching device 400 with the retaining tab 396, causing both of the interlocking latch members 402 and 404 to be depressed until the retaining tab 396 is aligned with the channel 410. At that point, the restoring force imparted to the latching device 400 due to the resiliency of the interlocking latch members 402, 404 causes engagement of the channel 410 with the retaining tab 396, thereby placing the junction block 108 in a releasably locked position relative to the access module 102.

FIG. 10 specifically illustrates a cross-sectional view along lines 10—10 of FIG. 8, and illustrates the middle walls 384. As earlier described, the middle walls 384 forms the open areas 386 on each side of the junction block 108 for receiving electrical receptacle blocks, such as the electrical receptacle block 332 shown in FIG. 7. The channel 410 is illustrated in FIG. 10 as being defined by opposing edges of the interlocking latch members 402, 404. A lower surface of the channel 410 is defined by the tongue 406 of the member 402. The tongue 406 engages the groove 408 of member 404. The cooperation of the tongue and groove 406, 408 causes the latching device 400 to disengage from the retaining tab 396 when either of the interlocking latch members 402, 404 is depressed and forced toward the upper wall 382. As can be seen from FIG. 10, when the latch member 402 is depressed, an upper edge of the latch member 402 exerts pressure on the latch member 404. This causes both members 402, 404 to be depressed, releasing engagement with the retaining tab 396 and allowing the junction block 108 to be slidably removed from the retaining tab 372. The same result may be obtained when the tongue 406 of the latch member 402 is forced against the lower edge of the groove of member 404.

As earlier described, the interlocking latch members 402 and 404 may be formed integral with the upper wall 382 in a suitable manner. With this configuration, and as shown in FIG. 10, the latch members 402 and 404 are integrally connected with the upper wall 382 by vertical hinge sections 416 and 418. The vertical hinge sections 416 and 418, like the interlocking latch members 402 and 404, are preferably formed of resilient plastic material so as to provide a restoring spring force for the latch members 402, 404 when the same are depressed and forced toward the upper wall 382.

In accordance with the forgoing, the junction block 108 and associated junction block cable 104 may be releasably secured to a floor access module component 101 for purposes of providing electrical power in an appropriate position in the floor access layout. Concepts associated with mounting assemblies for electrical junction block housings are disclosed in the inventors own U.S. Pat. No. 4,993,576 issued Feb. 19, 1991. The teachings of U.S. Pat. No. 4,993,576 are hereby incorporated by reference herein. As described in subsequent paragraphs herein, one or more of the junction block cables 104 may be releasably interconnected to a floor access module 102 as desired by the electrical system designer.

Figure 12:
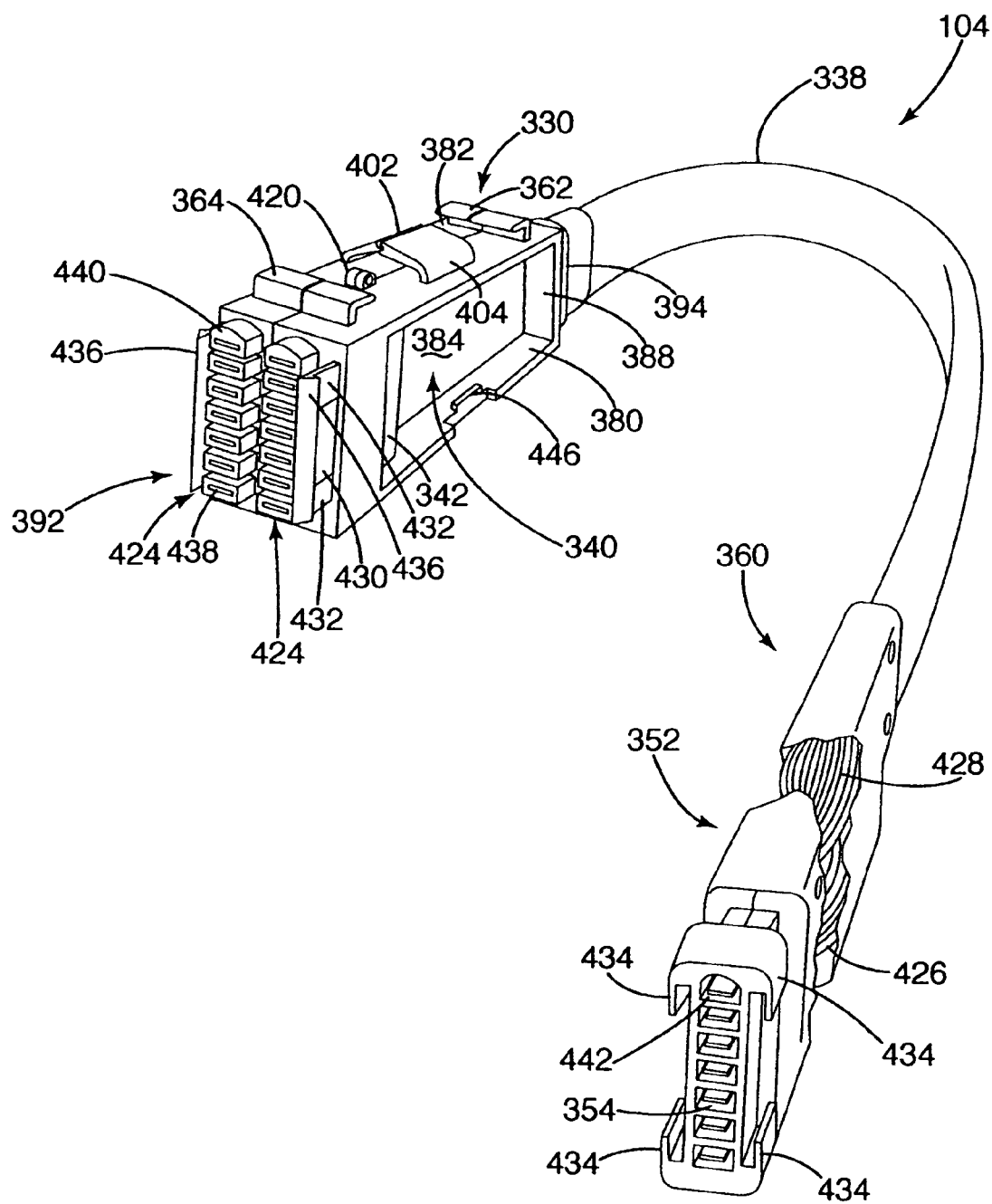
FIG. 12 is a perspective view of a junction block assembly in accordance with the invention, as provided with connection lugs which provide a means for securing preformed halves of the junction block together along a seam.

Additional detail regarding the junction block cables 104 is illustrated in the enlarged perspective view of the one of the junction block cables 104 as shown in FIG. 12. As earlier described with respect to FIGS. 6–11, the junction block cable 104 includes a junction block 108, adjustable cable or conduit section 338 and male connector block 106. With respect specifically to the junction block 108, the block 108 as also previously described, includes a lower wall 380, upper wall 382 and middle wall 384 which form an open spatial area 340 on each side of the junction block 108 (only one side of which is illustrated in FIG. 12). In addition, as also described with respect specifically to FIGS. 8–11, the block 108 includes a female connector block pair 392 extending outwardly from one end of the general housing structure of the block 108. Extending outwardly from the other end of the junction 108 is a cable connector block 394 which, in turn, is interconnected to the cable of conduit section 338. As further described with respect to FIGS. 8–11 for purposes of releasably securing junction block 108 to a floor access module 102, L-shaped mounting lugs 362 and 364 are integrally mounted on the top of the upper wall 382. Also mounted on the top of the upper wall 382 are interlocking latch members 402 and 404.

The junction block 108 is also provided with connection lugs 420 which provide a means for securing preformed halves of the junction block 108 together along the seam 422 as further illustrated in FIG. 12. The particular means for forming the junction block 108 and the formation as an integral block or otherwise as separate pieces do not form any of the basic principles of the invention, and various types of structures can be employed. As shown primarily in FIG. 13, which comprises a sectional view through lines 13—13 of FIG. 12, the junction block 108 comprises a pair of female receptacle connectors 342, with each of the connectors 342 being located in a separate one of the open spatial areas 386 on each side of the junction block 108. Electrical outlet receptacle blocks, such as the electrical receptacle block 332 previously described with respect to FIG. 7 and illustrated in greater detail in further drawings, are adapted to engage the female receptacle connectors 342. In this manner, each of the junction blocks 108 is adapted to support, if desired, two electrical outlet receptacle blocks 332, one on each side of the junction block 108. However, for purposes of selective interconnection of the electrical receptacle blocks 332 with electrical devices above the floor, the electrical system designer will likely use only one electrical receptacle block 332 for each of the junction blocks 108, with the electrical receptacle block 332 electrically connected to the junction block 108 within the open spatial area 386 which faces inwardly of the access floor module 102 to which the junction block cable 104 is releasably secured as previously described with respect to FIGS. 8–11.

As previously described, the junction block 108 further comprises a female connector block pair 392 extending outwardly from the junction block 108 adjacent the female receptacle connectors 342. The female connector block pair 392 comprises a pair of female connector sets 424. Each of the female connector sets 424 is essentially positioned in a straight line relationship with a corresponding one of the female receptacle connectors 342. As will be described in subsequent paragraphs herein, the female connector block pair 392 is adapted to electrically interconnect the corresponding junction block cable assembly 104 to one or two others of the junction block cable assemblies 104.

In addition to the female connector block 392, the junction block cable assembly 104, as previously described herein, comprises the male or end connector block 106. The male or end connector block 106 comprises a male connector 352 having a series of male connector terminals 354 positioned at the terminating end thereof. The male or end connector block 106 is connected to the junction block 108 by means of the adjustable cable or conduit section 338.

Electrical power is transmitted through the junction block cable assembly 104 by means of electrical wires disposed in the adjustable cable or conduit section 338, with the wires terminating at the male connector terminals 354 of the male connector 352. Correspondingly, these wires are further connected to the female receptacle connectors 342 located on the junction blocks 108. The female receptacle connectors 342 are further electrically connected to the female connector sets 424 of the female connector block pair 392. In this manner, electrical power may be transmitted from external connections to the male connector terminals 354 or female connector sets 424 to the female receptacle connectors 342.

For purposes of accommodating distance requirements between and among access floor modules 102, the cable or conduit section 338 may be adjustable and comprise an expandable flexible conduit, as is well known in the art. For purposes of providing such adjustability, the male or end connector block 106 may be provided with an inner spatial area 426, as shown in a partially broken-away view in FIGS. 6 and 12. The inner spatial area 426 is provided for storage of excess length of electrical wiring 428 in a coiled or other similar configuration. The excess length of electrical wiring 428 may be withdrawn with the adjustable conduit section 338 and expanded to an extended length. This type of an arrangement is similar to that disclosed in my earlier patent, U.S. Pat. No. 05,096,434 (dated Mar. 17, 1992) and entitled ELECTRICAL INTERCONNECTION ASSEMBLY, and further disclosed in my still earlier patent, U.S. Pat. No. 4,579,403 (dated Apr. 1, 1986) and entitled ELECTRICAL JUNCTION ASSEMBLY WITH ADJUSTABLE CONNECTORS.

The cable or conduit section 338 is preferably a flexible conduit which may be bent to accommodate a connection to others of the junction block cable assemblies 104 and access floor modules 102, rather than merely in straight line connections. Of primary importance, the male connector terminals 354 of a male or end connector block 106 of a particular junction block cable assembly 104 are electrically connectable to a female connector set 424 of a junction block 108 as associated with another of the junction block cable assemblies 104. In this manner, electrical interconnection of access floor modules 102 located at various positions under the floor illustrated in FIGS. 1 and 2 may be readily electrically interconnected. In fact, with the particular female connector block pair 392 of each junction block 108, it is possible to electrically interconnect two other junction block cable assemblies 104 through the male connectors 352 of each of the other cable assemblies 164.

Referring again to FIG. 12, each of the female connector sets 424 of the female connector block 392 is provided with a side flange 430 having upper and lower recessed areas 432. The upper and lower recessed areas 432 are adapted to assist in providing engagement with flanges 434 of one of the male or end connector blocks 106 associated with another of the junction block cable assemblies 104. In this manner, a releasable locking arrangement is provided between a female connector set 424 and the male connector terminals 354. The side flanges 430 are preferably made of a resilient plastic material and formed integral with the housing of the junction block 108 to which they are associated. Preferably, the side flanges 430 are also provided with an outwardly extending inclined end surface 436. When the surfaces 436 are engaged by flanges, such as the flanges 434 of the male connector 352 on the male or end connector block 106 of another junction block cable assembly 104, the flanges 430 will be deflected inward, allowing the flanges 434 of the male connector 352 to engage the recesses 432 so as to provide a locking engagement of the male and the female connectors. Preferably, each of the female connector sets 424 is provided with a plurality of female connector terminals 438 and a key lug 440. Correspondingly, the male connector 352, as previously described herein, is provided with a plurality of male connector terminals 354 and an opening 442 for receiving the key lug 440.

The electrical outlet receptacle block 332 is illustrated in perspective and side elevation views in FIGS. 14 and 15, respectively. In the particular embodiment of a receptacle block in accordance with the invention as set forth in FIGS. 14 and 15, block 332 is provided with male connectors 444 at both ends, thereby allowing the receptacle block 332 to be plugged into either of the female receptacle receptors 342 associated with both sides of a junction block 108 of a junction block cable assembly 104. As shown in FIG. 13, the junction block 108 provided with the open spatial areas 340 in which to support the electrical receptacle blocks 332. Each of the open spatial areas 340 is provided, on the lower wall 380, with a slightly recessed locking flange 446. Although not shown in FIG. 12, a corresponding locking flange 446 is provided within the other open spatial area 340 on the side of the junction block 108 not shown in FIG. 12. Returning to FIGS. 14 and 15, the electrical receptacle block 332 is provided with a spring latch 448 disposed within a recess 450 in a lateral side surface 452 of the receptacle block 332. With respect to the particular open spatial area 340 illustrated in FIG. 12, the electrical receptacle block 332 illustrated in FIGS. 14 and 15 can be inserted into the open spatial area 340 so that the electrical receptacle sockets 454 face outwardly from the spatial area 340 illustrated in FIG. 12. The open spatial area 340 is of a sufficient depth and other dimensions so that the receptacle block 332 can be fully inserted into the spatial area 340. When inserted, the locking flange 446 will cause the spring latch 448 to be depressed. The receptacle block 332, with the particular open spatial area 340 illustrated in FIG. 12, may then be moved to the right (in the view shown in FIG. 12) to engage the female receptacle connectors 342. With respect again to the illustration in FIG. 14, the receptacle block 332 also includes recesses 456 so as to accommodate the locking flange 446. In the particular embodiment and views shown in FIGS. 12 and 14, movement to the right by a sufficient distance will cause the spring latch 448 to be moved past the locking flange 446, causing the spring latch 448 to return to its extended position. In this manner, the receptacle 332 may be retained in a locked position. The receptacle may be removed from electrical connection with the female receptacle connectors 342 by depressing the spring latch 448 and sliding the receptacle 332 to the right so as to align the locking flange 446 with the recess 108. FIG. 15 is a right-hand elevation of the receptacle 332, showing the right-hand male connector 444.

If the electrical receptacle block 332 is to be electrically interconnected to the other female receptacle connectors 342 within the open spatial area 340 on the opposing side of junction block 108 (not shown in FIG. 12), the receptacle block 332 will be inserted in the corresponding open spatial area 340 in the same manner as previously described, but may then be moved to the right (as viewed into the open spatial area 340) so as to electrically interconnect the male connectors 444 with the female receptacle connectors 342.

It will be understood that the embodiments disclosed herein are only illustrative of the invention and numerous other arrangements may be derived by those skilled in the art without departing from the spirit and scope of the invention.

The embodiments of the invention in which an exclusive property or privilege is claimed are defined as follows:

1. An electrical system adapted to be positioned under an access floor for supplying electrical power from at least one interconnected power source to selectively interconnected electrical devices, said electrical system comprising:
   a plurality of substantially identical electrical access floor modules selectively spaced under said access floor for providing conveniently located electrical power locations for energizing said electrical devices;
   a plurality of substantially identical junction block cables for electrically interconnecting said access floor modules to said power source and to each other;
   releasable connection means associated with said access floor modules and said junction block cables for releasably and mechanically connecting each access floor module to at least one of said junction block cables;
   a plurality of electrical receptacle blocks, each receptacle block comprising at least one electrical receptacle connectable to one or more of said electrical devices for supplying electrical power thereto, with each of said receptacle blocks further being electrically connectable to said junction block cables; and
   said access floor modules are substantially interchangeable with each other, and said junction block cables are substantially interchangeable with each other so as to provide said electrical system as a modular system which is adapted to be sized and configured in a manner which does not require any substantial number of different types and/or sizes of cables and other electrical equipment.

2. An electrical system in accordance with claim 1, characterized in that:
   each of said electrical receptacle blocks comprises a first predetermined terminal connection arrangement; and
   each of said junction block cables comprises a junction block connectable to at least one of said access floor modules through said releasable connection means, and having a second predetermined terminal connection arrangement for electrically and releasably engaging said first terminal connection arrangement.

3. An electrical system in accordance with claim 2 characterized in that
   each of said junction blocks comprises an external third terminal connection arrangement; and
   each of said junction block cables further comprises an electrical conduit section and a terminating connector electrically connected to said second terminal connection arrangement of said junction block of said junction block cable through said conduit section, said terminating connector being electrically and releasably engagable with a third terminal connection arrangement of another of said junction block cables.

4. An electrical system in accordance with claim 1, characterized in that said system further comprises a plurality of extension cables, each of said extension cables being electrically connectable to said junction block cables.

5. An electrical system in accordance with claim 4, characterized in that at least one of said extension cables includes a terminating connector electrically and releasably engagable with a third terminal connection arrangement of a junction block cable.

6. An electrical system in accordance with claim 4, characterized in that at least one of said extension cables includes a double terminating connector at one end of said extension cable, for electrical interconnection with two of said junction block cables.

7. An electrical system in accordance with claim 3, characterized in that said electrical system comprises a power input cable connectable to said power source, and further connectable to one of said terminating connectors of one of said junction block cables.

8. An electrical system in accordance with claim 1, characterized in that at least one of said electrical receptacle blocks includes duplex electrical receptacles.

9. An electrical system in accordance with claim 1, characterized in that at least one of said electrical receptacle blocks includes communication ports.

10. An electrical system in accordance with claim 1, characterized in that said electrical system further comprises:
   voice/data or other communication ports; and
   means associated with at least one of said access floor modules for mechanically and releasably connecting at least one of said communication ports to said one access floor module.

11. An electrical system in accordance with claim 10, characterized in that said system further comprises conventional communications element mounting brackets mechanically connectable to at least one of said access floor modules.

12. An electrical system in accordance with claim 3, characterized in that at least of said junction blocks is double sided so as to mechanically and electrically connect at least one of said electrical receptacle blocks to either side of said junction block.

13. An electrical system in accordance with claim 3, characterized in that said electrical conduit section of at least one of said junction block cables is adjustable in length.

14. An electrical system in accordance with claim 3, characterized in that said system may be sized and configured so that multiple junction blocks associated with multiple junction block cables may be mechanically and releasably interconnected to a single access floor module, with said multiple junction blocks being electrically interconnected to each other.

15. An electrical system in accordance with claim 3, characterized in that said third terminal connection arrangement of at least one of said junction blocks includes a connector block pair connectable to a terminating connector of each of two other junction block cables.

16. An electrical system in accordance with claim 3, characterized in that at least one of said junction blocks comprises a recessed area for releasably engaging at least one of said electrical receptacle blocks.

17. An electrical system in accordance with claim 3, characterized in that each of said junction blocks associated with one of said junction block cables is permanently connected to the associated one of said electrical conduit sections of said one of said junction block cables.

18. An electrical system in accordance with claim 17, characterized in that each of said terminating connectors associated with a particular one of said junction block cables is permanently connected to an associated electrical conduit section of said corresponding junction block cable.

19. An electrical system in accordance with claim 3, characterized in that each of said floor access modules comprises a floor component formed in a rectangular, boxed-like structure having an open top portion.

20. An electrical system adapted to be positioned under an access floor for supplying electrical power from at least one interconnected common power source to selectively interconnected electrical devices, said electrical system comprising:
   a plurality of electrical access floor modules selectively spaced under said access floor for providing conveniently located electrical power locations for energizing said electrical devices;
   a plurality of junction block cables for electrically interconnecting said access floor modules to said common power source;
   a plurality of electrical receptacle blocks, each receptacle block comprising at least one electrical receptacle electrically connectable to one or more of said electrical devices for supplying electrical power thereto, and comprising a first predetermined terminal connection arrangement;
   each of said junction block cables comprising a junction block connectable to an access floor module and having a second predetermined terminal connection arrangement for electrically and releasably engaging said first predetermined terminal connection arrangement, and an external third terminal connection arrangement;
   each of said junction block cables further comprising an electrical conduit section and a terminating connector electrically connected to said second terminal connection arrangement of said junction block of said junction block cable through said conduit section, said terminating connector being electrically and releasably engagable with a third terminal connection arrangement of another of said junction block cables; and
   said electrical floor access modules are substantially interchangeable with each other, and said junction block cables are substantially interchangeable with each other, so as to provide said electrical system as a modular system which is adapted to be sized and configured in a manner which does not require any substantial number of different types and/or sizes of cables and other electrical equipment.

* * * * *